Figure 3:
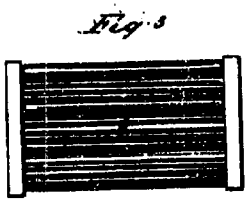
Figure 2:
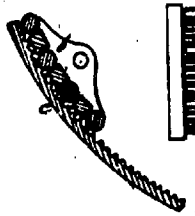
Figure 1:
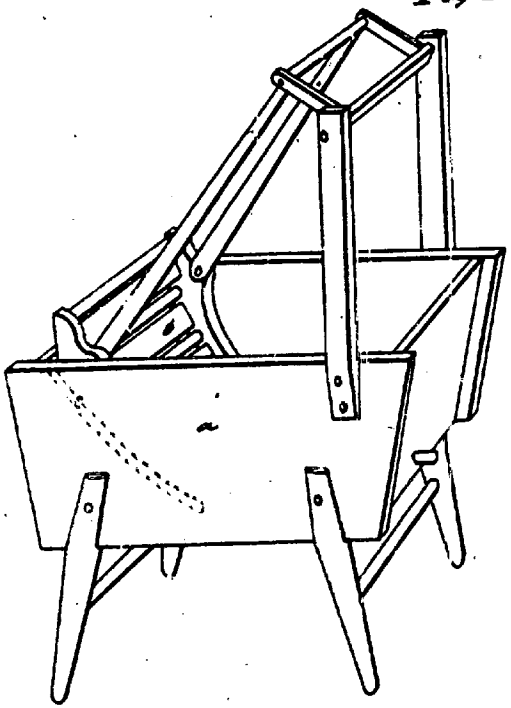

(12) United States Patent
Davis

(10) Patent No.: X7155
(45) Date of Patent: Jul. 5, 1832

(54) WINNOWING MILL, MACHINERY

(76) Inventor: Daniel Davis

Daniel Davis, of Cornish, N.H.
Letters Patent

The schedule referred to in these Letters Patent, and making part of the same, containing a description in the words of the said Daniel Davis, himself of his improvement in the winnowing mill. —

---

To all to whom these presents shall come; Be it known that I Daniel Davis of Cornish, in the County of Sullivan & State of New Hampshire have invented a new & useful improvement on the common winnowing mill, for cleaning grain, grass seed &c. and that the following is a full description of the said improvement as invented by me — It may be necessary however to premise that the form and construction of the frame & body of the mill are similar to those of the common winnowing mills which have been in use for many years, & are operated in the same manner, & that there is a little variation in the manner of shaking the riddles & some other minor improvements too trifling to notice — The Improvements consists. 1st. of a set of circular curved fans or blowers placed within the body of the mill which draw & press the air obliquely through the mill with a steady current —

These Fans or blowers are made of either Tin, brass, or other metallic substance or of wood & are attached to a shaft near the centre of the hind end of the mill. 2nd. The shoe that receives the chaff & grain from the hopper is placed sloping underneath the hopper & is narrower at the lower end, than at the upper, the better to correspond with the current of air ascending from the throat of the mill. to this shoe is attached a sieve placed in a horizontal position at the lower end of the shoe. 3d. of a set of Riddle sieves made of Tin sheet, brass, or of other metal which can be plated thin, or of stiff parchment. the riddles or sieves are made by punching round holes thro' the tin or other material used for them — the size of the holes in each riddle varying according to the use for which it is intended, & the size of the grain or grass seed to be cleansed. Where the grain first enters upon the riddles they are plain without holes. The riddles are placed sloping in the body of the mill, & are exchanged at pleasure for coarser or finer ones as occasion may require. In Testimony that the above is a true specification of my said improvement, as above described. I have hereunto set my hand this eighteenth day of June, in the year of our Lord one thousand eight hundred & thirty-two.

Witnesses

Silas Bryant Jr.

Harvey Chase

Daniel Davis

Enrd.

United States Patent

Patent No.: X7155

NO PRINTED SPECIFICATIONS AVAILABLE

E. Fisk

Washing Machine,

Patented May 25, 1832.